United States Patent Office 3,461,149
Patented Aug. 12, 1969

3,461,149
ISOCYANATE PROCESS
William Baptist Hardy, Bound Brook, and Robert Putnam Bennett, Bridgewater Township, Somerset County, N.J., assignors to American Cyanamid Company, Stamford, Conn., a corporation of Maine
No Drawing. Continuation-in-part of application Ser. No. 421,682, Dec. 28, 1964. This application July 1, 1965, Ser. No. 468,934
Int. Cl. C07c 119/04
U.S. Cl. 260—453        8 Claims

ABSTRACT OF THE DISCLOSURE

A process of preparing an isocyanate which comprises reacting, in the presence of a catalyst consisting essentially of a noble metal and a Lewis acid, carbon monoxide and an aromatic or heteroaromatic nitro compound in amounts of at least three moles of carbon monoxide per nitro group, said reaction being conducted under substantially anhydrous, hydrogen-free, superatmospheric pressure conditions, and at an elevated temperature below that at which the starting materials and the product isocyanate decompose.

---

This application is a continuation-in-part of application Ser. No. 421,682, filed Dec. 28, 1964, and now abandoned. The latter application is a continuation-in-part of Ser. Nos. 333,727 and 308,684, filed Dec. 26, 1963, and Sept. 13, 1963, respectively, both applications now having been abandoned.

This invention relates to a new method of preparing organic isocyanates. More particularly, it relates to the preparation of isocyanates by reacting an organic nitro compound and carbon monoxide under elevated temperature and pressure conditions and in the presence of a suitable catalyst. Additionally, it relates to the new catalystic system usable in said new method.

Literally tons of isocyanates, particularly aromatic isocyanates, are produced and consumed annually. The most notable use to which they are put is as intermediates in the manufacture of urethane polymers. This end-use alone consumes isocyanates at the rate of about 100 million pounds annually, and the rate is constantly increasing.

Commercial needs are currently satisfied by a process which comprises reacting phosgene with an amino compound corresponding to the desired isocyanate, the reaction being conducted at elevated temperatures and pressures. Both phosgene and aromatic amino compounds are relatively expensive materials, and operations are often complicated because of the extreme toxicity of phosgene gas. For these and other reasons, there is a definite need for a new method to serve as a commercial route to isocyanates.

It is an object of this invention to provide a method by which isocyanates can be prepared from low cost starting materials. It is a further object to provide a method by which isocyanates can be prepared without use of phosgene. Other objects will become apparent from the ensuing description of this invention.

In accordance with this invention, it has been discovered that these objects can be economically and efficiently accomplished by a new high temperature-high pressure process which requires as its essential starting materials an organic nitro compound, carbon monoxide and a type of carbonylation catalyst. The carbonylation reaction of this invention effects the replacement of the oxygen on the nitro radical by carbonyl with the consequent formation of an isocyanate. The reaction can be schematically represented as follows:

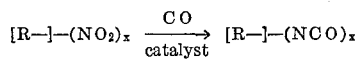

$$[R-]-(NO_2)_x \xrightarrow[\text{catalyst}]{CO} [R-]-(NCO)_x$$

In the foregoing equation, the symbol R is intended to represent an organic radical and $x$ represents an integer. The foregoing reaction, which entails conversion of the nitrogen atom in the nitro group to a lower valence state, is conducted under substantially anhydrous conditions in a substantially hydrogen-free atmosphere.

The reaction between the nitro compound and carbon monoxide may be carried out in an autoclave or any other high pressure reactor. A simple procedure is to charge the nitro compound and catalyst in a solvent, if one is employed, into the reaction vessel, introduce the proper amount of carbon monoxide, and then heat the mixture to obtain the desired reaction pressure. The reaction can be conducted as a continuous operation, or batchwise. Of course, the order of addition of the reactants may be varied to suit the particular apparatus which is employed. For example, the reactants may be introduced on a continuous basis into the heated reactor while, at the same time, the product is withdrawn. The reaction product is recovered and then treated by conventional procedures to effect separation of isocyanate from unreacted starting material, solvent, by-product, etc.

The present invention provides a generally applicable process for converting either mono- or poly-nitro derivatives to the corresponding isocyanates.

Typical of the nitro compounds which can be converted to isocyanates are carbocyclic aromatic derivatives such as nitrobenzene, o-, m- and p-dinitrobenzene, α- and β-nitronaphthalene, 1,5-, 1,6- and 1,7-dinitronaphthalene, 9-nitroanthracene, 4-nitrobiphenyl, 4,4'-dinitrobiphenyl and 1-nitroanthraquinone. Likewise, heterocyclic derivatives such as 5-nitropyrimidines may also be used.

The process of this invention is applicable to nitro compounds with or without other substituents, such as alkyl, alkenyl, alkoxy, halogen, acylamide, hydroxy, mercapto, carboxy, cyano, acyl, sulfo, sulfonyl, sulfamyl, carbamyl, phosphono, phosphino and silyl radicals. Among the substituted nitro compounds useful as starting materials herein, are o-, m- and p-nitrotoluene, m-chloronitrobenzene, p-methoxynitrobenzene, 2,4-dinitrotoluene, 2,6-dinitrotoluene, dinitrodiphenylmethane, dinitroditolylmethane, trinitrodiphenylmethane, tris(nitrophenyl)methane and tris(nitrotolyl)methane. Substituents do not, in general, interfere with the carbonylation reaction of this invention. Certain substituents may themselves react with carbon monoxide concurrent with carbonylation, but the latter reaction, nevertheless, occurs. Other groups in the nitro starting material may react with the isocyanate goup, thus yielding derivatives of isocyanates as reaction products. Still others may sterically retard the rate of isocyanate formation without preventing it entirely. With these qualifications, the process of this invention is applicable to any organic compound with a nitro group.

Reaction conditions can be varied over a wide range provided several requirements with respect to pressure and temperature are met. Pressures within the reactor must be in the range of about 40 p.s.i. to 100,000 p.s.i., or higher. Preferably, pressure should be above 1,000 p.s.i. The reaction will proceed at temperatures above 60° C., and preferably between 150° C., and the temperature of decomposition of either starting material or product. The temperature will vary inversely with residence time of material in the reactor. With more reactive starting materials, less stringent conditions may be employed. The particular conditions for a given reactant are easily determined in accordance with the foregoing principles.

It is desirable, but not necessary, that a solvent be employed, since many nitro compounds are solids under reaction conditions. Suitable solvents are anhydrous liquids in which the nitro compound is soluble or dispersible, e.g., benzene, toluene, xylene, aliphatic halogenated hydrocarbons such as 1,1,2-trichloro-1,2,2-trifluoroethane, halogenated aromatic hydrocarbons such as monochlorobenzene, dichlorobenzene and trichlorobenzene. It is important that the solvent, as well as the other materials charged into the reactor, be anhydrous, since in the presence of water isocyanates are converted to urea derivatives The amount of carbon monoxide pumped into the reactor should be sufficient to provide at least three moles of carbon monoxide per nitro group. Preferably, however, a large excess should be employed to give the superatmospheric pressures required for preferred operation of the present invention.

The catalyst for the carbonylation reaction of this invention comprises a noble metal and a Lewis acid as defined in the reference book by Jack Hine, "Physical Organic Chemistry," 1962, McGraw-Hill Book Co., New York. According to the reference, Bronsted acids are included by the term "Lewis Acids." The noble metal may be used either in a metallic or a chemically combined state. It may be deployed either with or without a physical support. Among the noble metals which can be employed are platinum, palladium, ruthenium, rhenium, rhodium, osmium, silver, gold, iridium and mercury. Among the chemical forms of these metals which can be used herein are oxides, sulfates, nitrates and halides, as for example: platinum oxide, platinum chloride, platinum nitrate, platinum sulfate and the corresponding palladium compounds.

The Lewis acid component of the catalyst can be a halide (e.g., an iodide, bromide, chloride or fluoride), an acetate, a sulfate or a phosphate of a metal such as tin, titanium, gallium, iron, aluminum or copper.

As specific examples of Lewis acids one can name ferric chloride, ferrous chloride, stannic chloride, stannous chloride, aluminum chloride, titanium tetrachloride, aluminum bromide, gallium trichloride and cuprous chloride. Additional examples of the salt type of Lewis acids are listed in the reference book by George A. Olah, "Friedel-Crafts and Related Reactions," volume I, 1963, Int. Publ., New York.

An example of the Bronsted acid-type of Lewis acid is anhydrous hydrogen chloride. Other Bronsted acids may be used providing they do not irreversibly react with the isocyanate product. Examples of such reactions are to be found in "Recent Advances in Isocyanate Chemistry" by R. G. Arnold et al., Chemical Reviews 57, 47 (1957).

Within the group of useful Lewis acids, it is preferred to use strong Lewis acids having a halide anion. Chlorides of iron and aluminum are especially preferred.

The physical form of the catalyst can be varied to suit particular needs. The metals can be self-supported or deposited upon a support which disperses the metals so as to increase active surface area. Such porous supports include alumina, silica, carbon, barium sulfate, calcium carbonate, asbestos, bentonite, diatomaceous earth, fuller's earth, and the like.

It is possible to deposit the noble metal on a support and form the Lewis acid component in situ by conducting the reaction in a vessel which can supply a cation, when using a solvent medium which can supply an anion under reaction conditions. For example, if the walls of the reaction vessel contain iron and a halogen-containing solvent such as 1,1,2-trichloro-1,2,2-trifluoroethane is used, under reaction conditions the corresponding iron halide will be formed. This fulfills the reaction requirement for a Lewis acid. Similarly, a noble metal and a base metal capable of forming a Lewis acid (e.g., iron or aluminum) may be deposited on a porous support. This base metal, in conjunction with a solvent medium comprising a halogenated solvent (e.g., 1,1,2-trichloro-1,2,2-trifluoroethane or a similar halogenated aliphatic hydrocarbon), forms a Lewis acid under reaction conditions. Other means of forming the Lewis acid in situ will be apparent from these procedures.

A very useful catalytic system consists of 5% palladium supported on alumina and ferric chloride. The catalyst should be used in an effective amount. This amount will be determined by reaction pressure and temperature, purity of the nitro starting material, etc. Once it is known that the desired reaction proceeds in the presence of a noble metal-Lewis acid catalyst, it is within ordinary means to determine how much of each will be used. It has been found that a useful range is in the area of about 0.1 to $10^{-5}$ moles of noble metal and 0.05 to $5 \times 10^{-4}$ moles of Lewis acid per mole of nitro group. Actually, as long as even trace amounts of the metals are present, reaction will proceed. The upper limit of catalyst usage is governed primarily by cost considerations. A preferred catalyst system will have about 0.02–0.001 mole of Lewis acid and 0.05 to 0.005 mole of noble metal per mole of nitro group. Within these areas, the centers of the respective ranges are especially preferred, but this preferred range depends greatly on the equipment and conditions used, i.e., the amount of agitation, concentrations, temperature, pressure, etc.

This invention is illustrated in the following examples, in which percentages are on a weight basis.

EXAMPLE 1

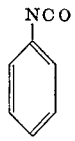

A suitable pressure vessel with stainless steel walls is charged with 90 parts of 1,1,2-trichloro-1,2,2-trifluoroethane, 12.3 parts (0.1 mole) of nitrobenzene and 5 parts of 5% palladium on alumina. The pressure vessel is sealed and flushed three times with carbon monoxide. Carbon monoxide is introduced into the clave until a pressure of 8,500 p.s.i. is obtained. With agitation, the pressure vessel is heated to 170° C. The internal pressure is then about 13,000 p.s.i. After maintaining the temperature at 170° C. for five hours, the pressure vessel is cooled to room temperature, vented, flushed with nitrogen and opened. The solvent-soluble material is removed, and the pressure vessel is rinsed with additional solvent. The combined solvents are filtered, and the solvent is removed from the product by distillation under reduced pressure. The crude product is then distilled to give phenyl isocyanate.

EXAMPLES 2–4

A series of reactions is carried out by the general procedure of Example 1, varying the pressure present during the heating.

| Example: | Pressure (p.s.i.) |
|---|---|
| 2 | 1,800 |
| 3 | 5,300 |
| 4 | 14,000 |

The same product is obtained.

EXAMPLE 5

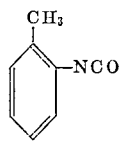

The general procedure of Example 1 is repeated, substituting an equivalent amount of o-nitrotoluene for the nitrobenzene, and using a temperature of 180° C. and pressure of 11,000 p.s.i. The product is o-tolyl isocyanate.

EXAMPLE 6

The general procedure of Example 5 is repeated, substituting an equivalent amount of p-nitrotoluene for the o-nitrotoluene and a pressure of 13,800 p.s.i. The product is p-tolyl isocyanate.

EXAMPLE 7

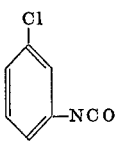

The procedure of Example 5 is repeated, substituting an equivalent amount of m-chloronitrobenzene for the o-nitrotoluene and using a pressure of 13,000 p.s.i. The product contains m-chlorophenyl isocyanate.

EXAMPLE 8

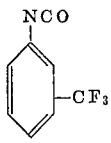

The general procedure of Example 5 is repeated, substituting an equivalent amount of m-nitrobenzotrifluoride.

EXAMPLE 9

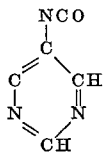

The general procedure of Example 1 is repeated, substituting an equivalent amount of 5-nitropyrimidine for the nitrobenzene and using a pressure of 14,400 p.s.i. The product is 5-pyrimidinyl isocyanate.

EXAMPLES 10–14

The general procedure of Example 1 is repeated, using a different noble metal catalyst, temperatures and pressures shown below. Phenyl isocyanate is obtained.

| Example | Noble Metal Catalyst | Temperature (° C.) | Pressure (p.s.i.) |
|---|---|---|---|
| 10 | 5% Pd/BaSO₄ | 170 | 10,500 |
| 11 | 5% Pd/CaCO₃ | 180 | 13,500 |
| 12 | 5% Rh/alumina | 180 | 11,500 |
| 13 | 5% Ru/alumina | 170 | 11,500 |
| 14 | Pd black | 170 | 14,500 |

EXAMPLE 15

A tantalum lined autoclave is charged with 12.3 parts of nitrobenzene, 0.73 part of anhydrous ferric chloride, 5 parts of 5% Pd/C and 100 parts of benzene. The clave is sealed, purged with nitrogen and pressurized with CO to 2,700 p.s.i. It is then heated with rocking at 190° C. for five hours, cooled, vented and discharged. The reaction mixture is filtered and the phenyl isocyanate is isolated as described in Example 1.

EXAMPLE 16

Example 15 is repeated, substituting 1,1,2-trichloro-1,2,2-trifluoroethane for the benzene and phenyl isocyanate is isolated from the product as described in Example 1.

EXAMPLE 17

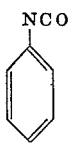

A suitable stainless steel pressure vessel is charged with 40 parts of 1,1,2-trichloro-1,2,2-trifluoroethane, 12.3 parts (0.1 mole) of nitrobenzene and 0.3 part of platinum oxide catalyst. The pressure vessel is sealed and flushed three times with carbon monoxide. Carbon monoxide is introduced into the clave until a pressure of 4,100 p.s.i. is obtained. With agitation, the pressure vessel is heated to 170° C. After maintaining the temperature at 170° C. for seven hours, the pressure vessel is cooled to room temperature, vented, flushed with nitrogen and opened. The solvent-soluble material is removed, and the pressure vessel is rinsed with additional solvent. The combined solvents are filtered, and the solvent is removed from the product by distillation under reduced pressure. The crude product is then distilled to give phenyl isocyanate.

The identical procedure is followed using palladium chloride as the catalyst and phenyl isocyanate is obtained in the reaction product.

EXAMPLE 18

Preparation of palladium-ferric chloride catalyst

A 5% palladium on alumina catalyst is treated with an ether solution of ferric chloride. The ether is evaporated from the resulting slurry, and the catalyst is dried by heating in a stream of carbon monoxide. The catalyst contains 3% iron.

EXAMPLE 19

A tantalum pressure vessel is charged with 12.3 parts of nitrobenzene, 120 parts of 1,1,2-trichloro-1,2,2-trifluoroethane, and 2 parts of 5% palladium 3% iron on alumina. The pressure vessel is sealed, flushed with nitrogen and pressurized with carbon monoxide to a pressure of 3,350 p.s.i. With agitation, the pressure vessel is heated to 170° C. (the internal pressure is then about 4,900 p.s.i.) and held at 170° C. for five hours. The pressure vessel is cooled, vented, and discharged and the phenyl isocyanate is isolated as described in Example 1.

EXAMPLE 20

The procedure of Example 19 is repeated using an Inconel pressure vessel, and the phenyl isocyanate is isolated as described above.

EXAMPLE 21

The procedure of Example 19 is repeated using a stainless steel pressure vessel and carbon monoxide at 12,550 p.s.i. Phenyl isocyanate is isolated as described above.

EXAMPLE 22

The procedure of Example 19 is repeated using a mixture of palladium chloride and iron powder as the catalyst and carbon monoxide at 5,500 p.s.i. Phenyl isocyanate is isolated from the reaction product.

EXAMPLE 23

A tantalum pressure vessel is charged with 12.3 parts of nitrobenzene, 120 parts of 1,1,2-trichloro-1,2,2-trifluoroethane, 5 parts of 5% palladium on carbon and 0.37 part of iron pentacarbonyl. The pressure vessel is sealed and pressurized with carbon monoxide to a pressure of 3,000 p.s.i. The pressure vessel is agitated, heated to 180° C., held at 180° C. for six hours, cooled, vented and discharged. The phenyl isocyanate is isolated by the procedure described in Example 1.

EXAMPLE 24

The procedure of Example 23 is repeated using 12.3 parts of nitrobenzene, 80 parts of benzene, 10 parts of 5% palladium on carbon and 0.44 part of stannic chloride. After carbon monoxide is introduced to a pressure of 4,000 p.s.i., the pressure vessel is heated at 190° C. for five hours. Phenyl isocyanate is obtained.

EXAMPLE 25

The procedure of Example 23 is repeated using 12.3 parts of nitrobenzene, 80 parts of benzene, 5 parts of rhodium on carbon and 1.41 parts of aluminum bromide. After carbon monoxide is introduced to a pressure of 3,000 p.s.i., the pressure vessel is heated at 190° C. for five hours. Phenyl isocyanate is obtained.

EXAMPLE 26

The procedure of Example 23 is repeated using 12.3 parts of nitrobenzene, 80 parts of benzene, 5 parts of rhodium on carbon and 0.5 part of ferrous chloride. After carbon monoxide is introduced to a pressure of 2,700 p.s.i., the pressure vessel is heated at 190° C. for five hours. Phenyl isocyanate is obtained.

EXAMPLE 27

The procedure of Example 23 is repeated using 12.3 parts of nitrobenzene, 80 parts of benzene, 5 parts of rhodium on carbon and 0.75 part of aluminum chloride. After carbon monoxide is introduced to a pressure of 3,000 p.s.i., the pressure vessel is heated at 190° C. for five hours. Phenyl isocyanate is obtained.

EXAMPLE 28

The procedure of Example 23 is repeated using 12.3 parts of nitrobenzene, 80 parts benzene, 5 parts palladium on carbon and 0.6 part of cupric chloride.

After carbon monoxide is introduced to a pressure of 4,000 p.s.i., the pressure vessel is heated at 190° C. for five hours. Phenyl isocyanate is obtained.

EXAMPLE 29

To a glass-lined stainless steel rocking autoclave is charged 9.1 parts of 2,4-dinitrotoluene, 80 parts benzene (saturated with HCl), 0.5 part of ferric chloride and 5 parts of 5% palladium on carbon. The clave is purged with nitrogen and pressurized with carbon monoxide to 4,000 p.s.i. The reaction mixture is heated with rocking at 190° C. for five hours, cooled, discharged and filtered. Examination of the filtrate shows the formation of 2-methyl-5-nitrophenyl isocyanate and 3-nitro-4-methylphenyl isocyanate. These two products may be separated from starting material by fractional distillation.

EXAMPLE 30

To a glass-lined stainless steel rocking autoclave is charged 3 parts of 2-methyl-5-nitrophenyl isocyanate, 2 parts of 5% palladium on carbon, 0.2 part of ferric chloride and 80 parts of benzene. The clave is flushed with nitrogen and pressurized with carbon monoxide to 4,000 p.s.i. The reaction mixture is then heated with rocking at 190° C. for five hours, cooled to room temperature and discharged; the reaction mixture is filtered to remove the catalyst. Examination of the filtrate shows the presence of 2,4-tolylene diisocyanate in addition to recovered starting material.

EXAMPLE 31

The general procedure of Example 15 is followed employing 12.3 parts of nitrobenzene, 5 parts of 5% Rh/C and 79 parts of benzene saturated in HCl, and the reaction time is 5 hours at 190° C. at 3850–2200 p.s.i.

The product is phenyl isocyanate.

EXAMPLE 32

Preparation of platinum-ferric chloride catalyst

A 5% platinum-on-carbon catalyst is treated with an ether solution of ferric chloride. The ether is evaporated from the resulting slurry and the catalyst is dried by heating in a stream of carbon monoxide. The catalyst contains 3% iron.

EXAMPLE 33

By the procedure of Example 32, 5% Pd/BaSO$_4$, 5% Pd/CaCO$_3$, 5% Rh/alumina and 5% Ru/alumina catalysts are respectively impregnated with solutions of aluminum bromide, aluminum chloride and ferric chloride to give noble metal-Lewis acid catalysts of this invention.

We claim.

1. A process of preparing an isocyanate which comprises reacting, in the presence of a catalyst consisting essentially of a noble metal and a Lewis acid, carbon monoxide and a carbocyclic aromatic nitro compound in amounts of at least three moles of carbon monoxide per nitro group, said reaction being conducted under substantially anhydrous, hydrogen-free, superatmospheric pressure conditions, and at an elevated temperature below that at which the starting materials and the product isocyanate decompose.

2. The process of claim 1 wherein the noble metal is dispersed on a porous support and the Lewis acid is a member selected from the group consisting of the halides of iron, aluminum, tin, titanium, gallium and copper.

3. A process of preparing an isocyanate which comprises, in the presence of a catalyst consisting essentially of a noble metal and a Lewis acid, reacting carbon monoxide and a carbocyclic aromatic nitro compound in amounts of at least three moles of carbon monoxide per nitro group, said reaction being conducted under substantially anhydrous, hydrogen-free conditions at a pressure of at least 1,000 p.s.i. and at an elevated temperature below that at which the starting materials and the product isocyanate decompose.

4. A process of preparing an isocyanate which comprises, in the presence of a Lewis acid-noble metal catalyst, reacting carbon monoxide and a carbocyclic aromatic nitro compound, in amounts of at least three moles of carbon monoxide per nitro group, said reaction being conducted under substantially anhydrous, hydrogen-free conditions at superatmospheric pressure and at a temperature of at least 150° C.

5. A process of preparing an isocyanate which comprises, in the presence of a Lewis acid-noble metal catalyst and an inert anhydrous liquid solvent, reacting carbon monoxide and a carbocyclic aromatic nitro compound in amounts of at least three moles of carbon monoxide per nitro group, under substantially anhydrous, hydrogen-free conditions, said reaction being conducted at a pressure above about 1,000 p.s.i., and at a temperature above about 150° C. but below that at which the starting materials and the product isocyanate decompose.

6. The process of claim 1 wherein the noble metal is in the metallic state or is in a chemically combined state as an oxide, sulfate, nitrate or halide of a noble metal.

7. The process of claim 1 wherein the Lewis acid is ferric chloride or ferrous chloride.

8. The process of claim 7 wherein the noble metal is rhodium or palladium.

References Cited

UNITED STATES PATENTS 3,070,618   12/1962   Drummond _____ 260—453

CHARLES B. PARKER, Primary Examiner

DOLPH H. TORRENCE, Assistant Examiner

U.S. Cl. X.R.

252—460, 472, 474; 260—77, 251, 645, 646, 689